United States Patent

Pollinger

[15] 3,688,703

[45] Sept. 5, 1972

[54] TILT CONTROL SYSTEM RESPONSIVE TO THE CURVILINEAR TRAVEL OF A VEHICLE

[72] Inventor: Hans Pollinger, Munich, Germany

[73] Assignee: Knorr-Bremse GmbH, Moosacher Strasse, Germany

[22] Filed: Jan. 26, 1971

[21] Appl. No.: 109,896

[30] Foreign Application Priority Data

Jan. 26, 1970 Germany..........P 20 03 334.5

[52] U.S. Cl..............................105/453, 280/112 A
[51] Int. Cl............................................B60g 21/06
[58] Field of Search....115/453, 164; 280/112 A, 124

[56] References Cited

UNITED STATES PATENTS 2,353,503  7/1944  Rost et al................280/112 A

Primary Examiner—Drayton E. Hoffman
Assistant Examiner—George H. Libman
Attorney—Edmund M. Jaskiewicz

[57] ABSTRACT

A system is disclosed for controlling the air cushion suspension system of a railway vehicle so that the vehicle is tilted in the proper direction in r response to following a curvilinear path. Control signals are generated in response to the magnitude and direction of deflection of a suspended mass which senses the centrifugal forces and accelerations acting transversely upon the vehicle. These control signals are differentiated and in response to both control signals and differentials thereof the direction actuating signals are generated from two pair of AND circuits connected to two OR circuits with the direction actuating signals controlling the air cushion suspension to tilt the vehicle in the proper direction when travelling a curvilinear path.

3 Claims, 3 Drawing Figures

INVENTOR.
HANS POLLINGER

TILT CONTROL SYSTEM RESPONSIVE TO THE CURVILINEAR TRAVEL OF A VEHICLE

The present invention relates to railway vehicles having air cushion suspension systems, more particularly, to a tilt control system having a suspended mass responsive to transverse forces and accelerations acting on the vehicle as the vehicle travels a curvilinear path to actuate the air cushion suspension system to tilt the vehicle in the proper direction.

Air cushion suspension systems having a level regulator and a curvature responsive control for the heights of the cushion bellows have already been incorporated in railway vehicles. Such a system generally comprises a compressor for pumping air from the air cushion bellows on the inside of the curve to the bellows on the outside of the curve in response to curvilinear travel of the vehicle. The compressor is generally a turbo-compressor and is connected in series with the air cushion bellows on both sides of the vehicle. The compressor is driven by an electric motor whose starting, stopping and direction of rotation is controlled by contacts actuated by the swinging movement of a pendulum mounted in the vehicle. The shut-off valve is opened only while the compressor is running. The curvature responsive control mechanism comprises a pendulum mounted in the vehicle so as to swing in a plane transverse to the longitudinal direction of the vehicle. When the vehicle travels along a curve, the pendulum will swing outwardly under centrifugal force and will thus actuate contacts to start the electric motor rotating in the proper direction so that air will be pumped from the air cushion bellows on the inside of the curve to the bellows on the outside of the curve. This transfer of the air will thus decrease the height of the bellows on the inside of the curve and increase the height of the bellows on the outside. As a result of the change in height of the bellows, the vehicle body will be tilted toward the inside of the curve. The compressor will continue to deliver air to the outside bellows until either the vertical axis of the vehicle becomes parallel to the pendulum or until the maximum inclination of the vehicle body has been reached and a limit switch stops further delivery of the air.

Such a curvature responsive control device has a number of disadvantages. Since the pendulum is susceptible to swinging movement by every momentary acceleration of the vehicle produced by irregularities in the road bed or vibrations of the vehicle, it is necessary to suppress the movement of the pendulum. In order to screen out such momentary swinging movements caused by lateral vibrations of short duration it has been proposed to connect retarding members on the contacts of the pendulum to delay a signal being transmitted until after the outward swing of the pendulum continues beyond a predetermined period of time. Since with these retarding and delaying devices the compressor will not be energized until sometime after the vehicle has entered a curve, it is apparent that the tilting of the vehicle body toward the inside of the curve will be correspondingly delayed. During the elapse of time from the entry of the vehicle into the curve until the tilting beings, passengers in the vehicle will be subjected to a centrifugal force toward the outer periphery of the curve. As the vehicle leaves the curve the centrifugal force on the pendulum will decrease.

However, if the tilt limiting mechanism becomes actuated before the vehicle emerges from the constant radius portion of the curve the pendulum will remain in its inclined position. Since the tilting movement exerted by the air cushions upon the vehicle body will remain constant but the centrifugal forces acting upon the vehicle body will decrease, the vehicle body will tend to swing in an undesired manner toward the inside of the curve. Because of this further tilting and the subsequent decrease of the centrifugal force the pendulum, being subjected to the delayed action, will return from its outwardly swung position to its mid-position. During this movement of the pendulum, however, there will not be any return of the vehicle body to its vertical upright position. The compressor will not begin to pump air from the outside bellows to the inside bellows in response to signals from the pendulum after elapse of the delay time until after the pendulum, in response to a termination of the tilting of the vehicle body, swings outwardly in the opposite direction. As the air is pumped back into the inside bellows, the vehicle body will be returned to its upright position. It is now apparent that the passengers who have been previously subjected to a centrifugal force toward the outside of the curve because of the limitation on the maximum tilt of the vehicle will now be subjected to a force directed toward the inside of the curve as a result of an increase in the tilt of the vehicle body as it leaves the curve. This change of direction in the centrifugal force produces a disagreeable and uncomfortable effects in the passengers.

The above mentioned disadvantages and difficulties are inherent in curvature responsive control devices wherein a pendulum is employed to indicate the curvilinear path of the vehicle. For precise tilting of a railway vehicle having an air cushion suspension it was proposed to provide a gyroscope which by means of a suitable measuring device, would generate an actuating signal for tilting of the vehicle as soon as the path of the vehicle changes from a straight line to a curvilinear one. The use of a gyroscope was more satisfactory since the air cushion suspension system now received an actuating signal to disengage the level regulating control for the vehicle body so as to avoid any reverse tilting of the vehicle body. The signal for actuating the tilting mechanism was also stopped before the vehicle left the transitional portion of the curve and entered the constant radius portion because as the vehicle travels along a path of constant radius the centrifugal force will remain constant. As the vehicle proceeded from the curve onto the straight portion of the road bed the control mechanism delivered air to the air cushion suspension system to return the vehicle body into the upright position. This actuating signal together with the signal for disengaging the level regulator of the air cushion suspension system must terminate before the vehicle leaves a transition portion of the curve to enter a straight track. The gyroscope as a control device was satisfactory in controlling the tilting of a railway vehicle since such a control device now generates actuating signals with the relationship to the curvilinear and rectilinear movement of the vehicle as described above.

The proposed control device essentially comprises a gyroscope which was responsive to the curvilinear movement of the railway vehicle and generated control signals. There were also means responsive to the curvilinear control signals for generating signals indicating the magnitude and direction of angular acceleration and angular velocity of the vehicle. Responsive to the angular acceleration and angular velocity signals, signal modulator means generated direction actuating signals which controlled the air cushion suspension system to deliver air from the air cushions on one side of the vehicle to the cushions on the other side of the vehicle whereby the vehicle is tilted in the proper direction depending on the direction of curvilinear travel of the vehicle.

Such a tilt control system can be modified so as to be independent of the air cushion suspension system by providing special cylinders actuated by compressed air or hydraulic fluid. Furthermore, actuating signals generated under these mentioned conditions may also be employed for controlling the coupling device of a railroad vehicle, a rotary support, or a running axle precisely in response to the curvature of the road bed.

It is therefore the principal object of the present invention to provide a novel and improved curve responsive tilt control system for a railway vehicle having an air cushion suspension system.

It is another object of the present invention to provide a curve responsive tilt control system for a railway vehicle which has all the advantages of such a system having a gyroscope but which is simpler in construction and less expensive to install and operate.

The objects of the present invention are achieved by the curve responsive tilt control system for a railway vehicle provided with an air cushion suspension system as disclosed herein. According to one aspect of the present invention this control system may comprise measuring means within the vehicle for generating control signals responsive to the magnitude and direction of centrifugal forces and accelerations acting transversely on the vehicle. The measuring means may comprise a suspended mass elastically deflectable transversely with respect to the longitudinal axis of the vehicle. Means are also provided for differentiating the control signal so as to generate output signals which are differentials of the measuring means control signals. Signal modulator means are connected to the measuring means and differentiating means for generating actuating signals to control the air cushion suspension system so that the vehicle is tilted in the proper direction depending upon direction of curvilinear travel of the vehicle.

Other objects and advantages of the present invention will be apparent from the accompanying description when taken in conjunction with the following drawings, which are exemplary, wherein.

Proceeding next to the drawings wherein like reference symbols indicate the same parts throughout the various views a specific embodiment and modification of the present invention will be described in detail.

Figure 1:
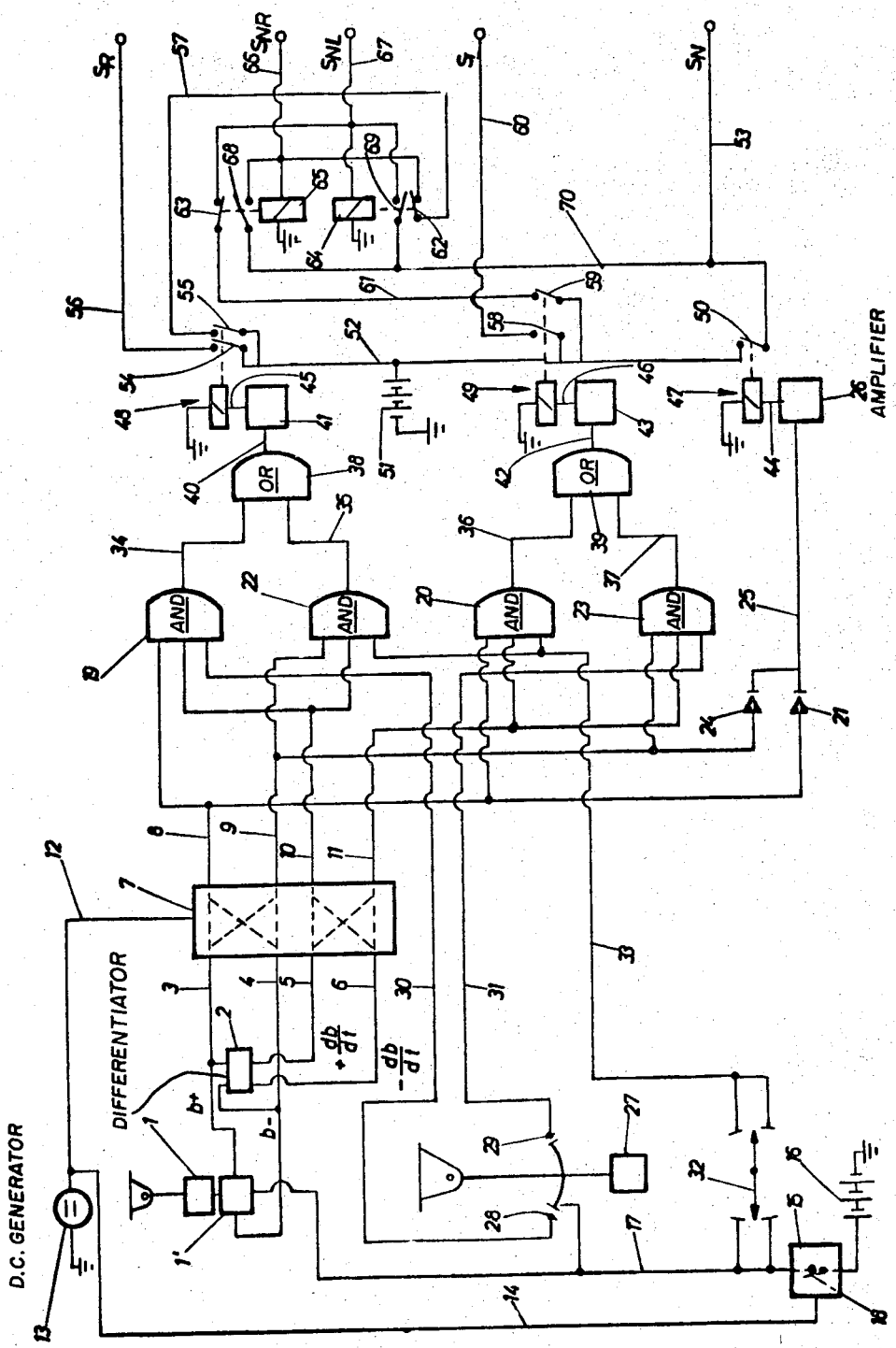
FIG. 1 is a schematic representation of the control device according to the present invention.

In FIG. 1 there is indicated at 1 a suspended mass or pendulum mounted within the vehicle and elastically deflectable or pivotable transversely with respect to the direction of travel or longitudinal axis of the vehicle. The suspended mass 1 is coupled inductively, capacitatively, or by an electrical resistance to a device 1' such that the device 1' together with the suspended mass 1 will generate measurement signals $+b$ and/or $-b$ which correspond to the magnitude and deflection of the suspended mass 1. It is thus apparent that the generated measurement signals $+b$ and $-b$ are indicative of the centrifugal forces or accelerations acting transversely on the vehicle with the direction of the effect of the centrifugal forces or accelerations determining the sign ($+$ or $-$) of these signals.

Figure 3:
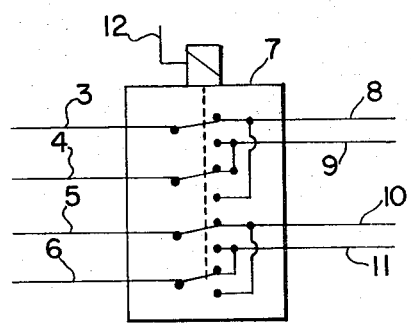
FIG. 3 is an electrical circuit diagram showing the connection within the switching device of FIG. 1.

A differentiator element 2 is connected to receive the measurement signals $+b$ and $-b$ and differentiates these signals to form the corresponding signals $+db/dt$ and $-db/dt$. The measurement signals from the device 1' and differentiator 2 are transmitted by conductors 3, 4, 5 and 6 to a switching device 7 which is dependent upon the direction of the travel of the vehicle and has two switching positions. This switching device is shown in greater detail in FIG. 3. In one switching position the signals $+b, -b, +db/dt$ and $-db/dt$ are transmitted to the respective conductors 8, 9, 10 and 11. In the second switching position, the conductors 3 and 4 are transposed to transmit their respective signals to the conductors 9 and 8 respectively and the connections of conductors 5 and 6 are transposed to transmit their respective signals to the conductors 11 and 10 respectively.

The switching device 7 is controlled through conductor 12 by the polarity of a voltage generated by a D.C. generator 13 which is driven in a known manner by an axle or wheel of the vehicle. When the vehicle travels in the forward direction, switching device 7 will be in the first switching position but upon reverse movement of the vehicle the switching device will be transposed into its second switching position.

There is an electrical lead 14 branching off from the conductor 12 to a switching device 15 which, independently of the polarity of the generated voltage, closes a switch 18 between a constant voltage source 16 and a voltage supply conductor 17 whenever the voltage in lead 14 exceeds a predetermined value. Since the voltage in lead 14 depends on the r.p.m. of the D.C. generator 13, switch 18 will close only after the speed of the vehicle exceeds a certain minimum velocity. The measuring device 2 is supplied with electrical energy from the conductor 17.

The output conductor 8 of switching device 7 is connected to the input of an AND circuit 19, of another AND circuit 20 and to a diode 21. The output conductor 9 from switching device 7 is connected to the input of an AND circuit 22, of a second AND circuit 23 and to a diode 24. Output conductor 10 is connected to a second input of the AND circuit 19 and to a second input of AND circuit 22. Output conductor 11 is connected to the second inputs of AND circuits 20 and 23. The diodes 21 and 24 are connected to a common conductor 25 leading to the input of a signal amplifier 26.

Mounted within the vehicle is a second pendulum 27 which swings in a vertical plane transverse to the longitudinal axis or direction of travel of the vehicle. Contacts 28 and 29 are closed when engaged by the outwardly swinging pendulum. Contact 28 is closed by centrifugal force during forward movement of the vehicle along a right turn and is connected between the voltage supply conductor 17 and a conductor 30 connected to a third input of the AND circuit 19. Contact 29 which is closed during forward movement of the vehicle along a left turn curve connects the voltage supply conductor 17 with a lead 31 connected to the third input of the AND circuit 23. The pendulum functions to prevent overcontrolling while the vehicle travels along paths that are only slightly curved. When the contacts are closed by the swinging pendulum, actuating signals will be generated in response to similarly directed angular acceleration and angular velocity signals only after the pendulum has swung out in the opposite direction.

A central switch 32 is mounted on the vehicle and is responsive to the angle between the plane of the railway track and the deflection of vertical central longitudinal plane of the vehicle from its vertical position. The switch is provided with contacts for interrupting the production of actuating signals when angular acceleration and angular velocity signals are not in the same direction during that time that the angle between the plane of the railway track and the vertical longitudinal plane of the vehicle is at a right angle. In its open position switch 32 breaks the connection of voltage supply 16 with lead 33 connected to the third inputs of the AND circuits 20 and 22 only during travel along a level road where the cushioned portion of the vehicle body is parallel to the wheel axles, i.e., to the plane of the track.

The AND circuits 19, 20, 22 and 23 have the characteristic of transmitting a voltage signal to their respective outputs 34, 35, 36 and 37 only when a signal voltage reaches all of the input terminals simultaneously. The outputs 34 and 35 of AND circuits 19 and 22 are connected to the inputs of an OR circuit 38, while the outputs 36 and 37 of the two AND circuits 20 and 23 are connected to the inputs of an OR circuit 39. The OR circuits 38 and 39 have the characteristic of transmitting a signal to their respective outputs 40 and 42 only when a signal is received by one or both of their respective inputs. The output 40 of the OR circuit 38 is connected with the input of a signal amplifier 41 and the output 42 of the OR circuit 39 is connected with the input of a signal amplifier 43. When one of the amplifiers 26, 41 or 43 receives a signal, the signal will be transmitted from its respective output 44, 45 or 46 to the coil of its respective relay 47, 48 or 49. The relay 47 which is connected to the signal amplifier 26 closes a switch 50 when energized which in turn closes the connection of lead 52 from an electric power source 51 to a conductor 53 which delivers an actuating signal $S_N$. This actuating signal is delivered only when the vehicle is turning about its vertical axis but this signal is independent of the direction of the turn. In an air cushion suspension system having a tilt control system for the vehicle body, the actuating signal $S_N$ can be used for disconnecting the generally used level regulating means.

Relay 48 when non-energized maintains switches 54 and 55 open. Switch 54 connects lead 52 with a lead 56 for transmitting an actuating signal $S_R$ only upon the sensing of a shock or acceleration against the vehicle acting in a deflection to produce the signal $+db/dt$ which may be to the right. Relay switch 55 provides a connection of lead 52 with a lead 57. The relay 49 is connected to two relay switches 58 and 59 which are closed only when relay 49 is energized. The relay switch 58 connects lead 52 with an output conductor 60 which transmits an actuating signal $S_L$ to tilt the vehicle to the left upon sensing forces or accelerations acting in a direction opposite to those described above to generate a signal $-db/dt$. In the above described known air cushion suspension system, the actuating signals $S_R$ and $S_L$ are transmitted to devices which will tilt the vehicle body in one direction during the continued transmission of one of such signals but will tilt the body in the other direction during the continued transmission of the other of such signals.

The relay switch 59 connects lead 52 with a conductor 61. The conductors 57 and 61 lead to contacts 62 and 63 of relays 64 and 65 respectively with these contacts being closed when the relays are non-energized. Contact 62 is connected to an output lead 66 for an actuating signal $S_{NR}$. From contact 63 there is an output connector 67 delivering an actuating signal $S_{NL}$. The output 66 is also connected to the coil of relay 65 with the other end of the coil being connected to ground and to a contact 68 which remains open while relay 65 is non-energized. Output 67 is connected in a similar manner to the coil of relay 64 with the other end of the coil being connected to ground and to a contact 69 which remains open while the relay 64 is non-energized. Contacts 68 and 69 have their other sides connected to a conductor 70 leading to output 53.

In the known air cushion suspension system, while an actuating signal $S_{NR}$ or $S_{NL}$ is generated, the air cushion which at that time is on the outside of the curve is connected to a level regulator which is controlled only by the height of the longitudinal tilt axis of the vehicle.

The electrical energy supply connections to the AND circuits 19, 20, 22 and 23, the OR circuits 38 and 39 and the signal amplifiers 26, 41 and 43 are now shown in FIG. 1, but the necessary connections can be readily made through leads 17 with voltage source 16.

Figure 2:
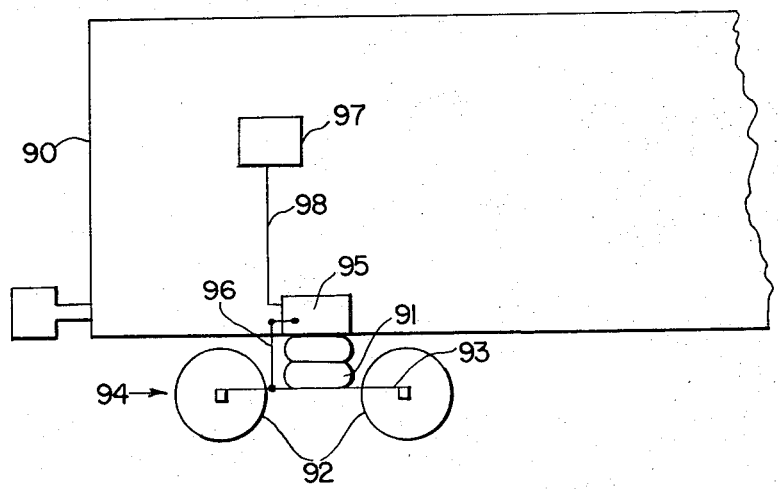
FIG. 2 is a schematic representation showing the several elements of the present invention mounted in a railway vehicle having an air cushion suspension.

As may be seen in FIG. 2 a railway car has a body 90 supported upon air cushions 91 which are located under both sides of the body and are supported on a beam 93 of a pivotably mounted truck 94 having wheels 92. The beam 93 is connected without any springs to the wheel 92 as indicated in the drawings. Positioned in the vicinity of the air bellows 91 on the car body is a control device 95 comprising a system of pressure observation and control in the bellows 95 and shown in the co-pending application, Ser. No. 808,225, now U.S. Pat. No. 3,572,747 filed on Mar. 18, 1969 by the same assignee as the present application. A compressor 28 shown in FIG. 1 of the above mentioned patent application can also be positioned in the control device 95 which can be driven by the wheel 92 in combination with a universal joint shaft such as in known accessory drives. For actuating valves 7, 8 and 43 shown in FIG. 1 of application Ser. No. 808,225 control rods 96 are employed and are positioned with respect to the beam 93 as shown in FIG. 2 of the drawings. The central switch 95 so as to be actuated by the control rods 96. All of the remaining elements illustrated in FIG. 1 can then be combined in a single device 97 positioned at any point within the vehicle body 90.

It is preferable to arrange the device 97 as near as possible to the horizontal longitudinal axis of the body. The device 97 is connected with control device 95 by a cable 98 which accommodates the output circuits 56, 66, 67, 60 and 63 for the actuating signals as well as the connecting leads 17 and 33 for central switch 32.

Operation of the Control System

When the vehicle travels at a slow speed and there is a corresponding low voltage in lead 14, switch 18 in switching device 15 will be open. The voltage supply lead 17 is then without voltage and measuring device 1′, pendulum 27 and central switch 32 cannot transmit any signals into their outputs 3–6, 30, 31 and 33. The AND and OR circuits 19, 20, 22, 23, 38 and 39 are thus unable to generate any signals so that relays 47, 48 and 49 and similarly relays 64 and 65 will remain un-energized and no actuating signals will be generated at the outputs 53, 56, 60, 66 and 67.

As the speed of the vehicle increases above a certain predetermined velocity, D.C. generator 13 will produce a voltage which will be sufficient to close switch 18 which thereby connects voltage supply lead 17 to the voltage source 16 and electrical energy is delivered to the components connected to this lead. During movement of the vehicle in the forward direction, switching device 7, under the influence of the corresponding polarity of the voltage produced by D.C. generator 13, will keep the leads 3 and 8, 4 and 9, 5 and 10 and also 6 and 11 connected with each other. During straight line or rectilinear travel of the vehicle no transverse forces or accelerations will be exerted on the suspended mass 1 and measuring device 1′ will not deliver any signals $+b$ or $-b$ to conductors 3–6. Accordingly, there will be no signals $+db/dt$ or $-db/dt$. During such rectilinear travel pendulum 27 will remain in its mid or stationary position. Contacts 28 and 29 will remain open and there will be no voltage in leads 30 and 31. The vehicle body will be in a position parallel to the plane of the road bed so that central switch 32 will not transmit any voltage through conductor 33. As a result, no signals will be transmitted to the inputs of AND circuits 19, 20, 22 and 23 and the OR circuits 38 and 39. Relay switches 50, 54 and 58 and also 55 and 59 will keep the outputs 53, 56, 60, 66 and 67 disconnected from the voltage source 31 and no actuating signals will be delivered from the system.

As the vehicle leaves a straight portion of track to enter a transition curve portion to the right, the suspended mass 1 will deflect to the left and measuring device 1′ will generate an increasing signal $+b$ into conductor 3. In accordance with the increasing transverse accelerations of the vehicle, a measurement signal $+db/dt$ responsive to the transverse force acting on the vehicle will be introduced into conductor 5 by the differentiator element 2. There will be no signals in the conductors 4 and 6.

At the same time, the second pendulum 27 will swing to the left and close contact 28 to connect the lead 30 with the voltage supply lead 17. The leads 8, 10 and 30 will each transmit a signal to the three inputs of AND circuit 19 and AND circuit 19 in turn will transmit a signal at its output 34. None of the other AND circuits 20, 22 and 23 will receive any input signals and hence will not transmit any output signals.

The OR circuit 38 will then receive an input signal from lead 34 and will transmit a signal through its output 40 to the amplifier 41 so as to energize the coil of relay 48. The relay switches 54 and 55 will thus be closed and output 56 will be connected with the voltage source 51 and will transmit an actuating signal $S_R$. At the same time, the signal $+b$ which was fed by measuring device 1′ into lead 3 will be transmitted through the output lead 8, across diode 21 and through conductor 25 to the signal amplifier 26 to transmit the amplified signal to relay 47 which will be energized to close the switch 50. This will connect the output lead to the voltage source 51 and an actuating signal $S_N$ will be transmitted through lead 70 to contacts 68 and 69 of relays 64 and 65.

Also with the closing of relay switch 55 lead 57 will be connected to the voltage source 51 and the same voltage will be transmitted across the closed contact 62 of relay 64 to output lead 66 which will receive an actuating signal $S_{NR}$.

The coil of relay 65 will be energized to open contact 63 while contact 68 will be closed. The output 66 in parallel with contact 62 will thereby be connected through contact 68, the leads 70 and relay switch 50 to voltage source 51.

As described above, a vehicle having an air cushion suspension system and a curvature responsive tilt control system may have its level regulator controlled by the actuating signals $S_N$ so that the heights of the air cushion bellows are kept constant. The actuating signal $S_R$ can effect a pumping of the air from the bellows on the right side of the vehicle into the bellows on the left side of the vehicle to gradually tilt the vehicle body to the right during the duration of actuating signal $S_R$. The actuating signal $S_{NR}$ which is responsive only to the height of the longitudinal tilting axis of the vehicle can effect a connection between the third level regulator and the air cushion bellows on the left side of the vehicle.

At the end of the transition portion, the vehicle will enter the constant radius portion of the curve. The transverse acceleration on the vehicle will remain constant. The measuring device 1′ will therefore continue to transmit a constant signal $+b$ into conductor 3 to indicate a right hand turning of the vehicle body while the signal $+db/dt$ which was previously transmitted into the lead 5 will cease. The AND circuit 19 will become blocked so that no signal will be transmitted to the inputs of OR circuit 38. The OR circuit will likewise be blocked so that there will not be any output signal at its output 40 and no signal will be transmitted to relay 48 through amplifier 41. The relay switches 54 and 55 will be opened and will disconnect the output lead 56 from the voltage source 51. The output signal $S_R$ will then stop and further tilting of the vehicle body on the air cushion will be discontinued and the present angle of inclination of the vehicle body will be maintained. The output lead 53 and also the output lead 66 will remain connected with voltage source 51 and relay 65 will remain energized. The actuating signals $S_N$ AND $S_R$ will therefore continue as the vehicle travels along the constant radius portion of the curve. The third regulator can now regulate the height of the air cushion bellows on the side of the vehicle at the outside of the curve.

When the vehicle travels from the constant radius portion of the curve into the exit transition portion which leads from the right turn to a straight section of track, the vehicle will experience a transverse acceleration in the opposite direction from that experienced at the entrance to the curve. The measuring device 1' will then transmit a decreasing signal +b to conductor 3. As a result, a measurement signal $-db/dt$ in response to the force now acting on the vehicle in the opposite direction is introduced into conductor 6 through the differentiator element 2. AND circuit 20 will thus receive a signal at each of its three inputs and will transmit an output signal at 36. The OR circuit 39 will now become conductive and through lead 42 and amplifier 43 will energize the coil of relay 49. This will close relay switches 58 and 59 to connect output lead 60 to the voltage source 51 and an actuating signal $S_L$ will be generated at the output 60.

In the air cushion suspension system, the actuating signal $S_L$ will control the delivery of air back from the air cushion bellows at the outside of the curve to the bellows at the inside of the curve. During this time the actuating signals $S_N$ and $S_{NR}$ will continue to be generated.

When the vehicle leaves the exit transition portion and travels into a straight portion of track, the vehicle will no longer experience any transverse acceleration. As soon as the vehicle reaches the straight section of track, the transverse acceleration acting on the vehicle will become zero and both measurement signals +b and $-db/dt$ will become zero. AND circuit 20 and the serially connected OR circuit 30 will both become blocked and relay 49 will be de-energized. Relay switches 58 and 59 will now open and will interrupt the connection of the output lead 60 with voltage source 51. This will stop the generation of the actuating signal $S_L$.

At the same time, voltage will be shut off through diode 21, lead 25 and the control input of the signal amplifier 26. Relay 47 will thus become de-energized and relay switch 50 will open. The output lead 53 will be disconnected from the voltage source 51. This will stop the generation of the actuating signal $S_{NR}$. In the vehicle air cushion suspension system which is actuated by the control system disclosed as this invention the interruption of the actuating signals $S_L$, $S_N$ and $S_{NR}$ will stop the pumping of the air from the bellows at the outside of the curve, to the bellows at the inside of the curve, will disconnect the third level regulator from the air cushion bellows at the outside of the curve, and will reestablish the normal operation of the lateral level regulating devices. If the vehicle body has not yet been brought back to its initial vertical position by this pumping back of the air, this repositioning of the vehicle body can be carried out by the lateral level regulators. During this process, the pendulum 27 will open contact 28 to disconnect lead 30 from the voltage source 16. The central switch 32 will remain to its normal resting position and disconnect lead 33 from the voltage source 16. In this manner, the original conditions of the system are restored.

When the vehicle enters a left-hand turn a corresponding process will occur but in the opposite sense. As the vehicle enters the transition curve portion turning to the left, measurement signals $-b$ and $-db/dt$ will be transmitted into the conductors 4 and 6 respectively. Only signal $-b$ will occur in the constant radius portion of the curve and signals $-b$ and $+db/dt$ will appear as the vehicle travels along the exit transition portion of the curve from the left turn to a straight section of track.

As the vehicle travels along a curved track, the pendulum 27 will seek a position in the direction of the resultant of the force of gravity and the centrifugal force. When only a slight curve is encountered and the vehicle body is tilted too rapidly by the pumping of air from the air cushion bellows on the inside of the curve to the bellows on the outside of the curve, the pendulum 27 may reach the inclination corresponding to the momentary curvature of the path and the vehicle speed and will open contacts 28 or 29. In this manner AND circuit 19 or 23 will be blocked to stop the generation of actuating signals $S_R$ or $S_L$. The pendulum 27 therefore functions to prevent excessive tilting of the vehicle body while entering a curve.

If the vehicle should be returned to a completely vertical upright position by the pumping of the air from the air cushion on the outside of the curve into the air cushion on the inside of the curve before the vehicle has reached the straight portion of the path, the central switch 32 will interrupt the voltage along lead 33 when the vehicle body moves into a position parallel to the plane of the road. This will block AND circuits 20 or 22 and will stop the generation of the continuously present actuating signals $S_L$ or $S_R$. The pumping of the air will thus be interrupted and the vehicle body will be maintained in its vertical upright position.

Pendulum 27 thus prevents over-control while the vehicle enters a curve and central switch 32 prevents over-control while the vehicle leaves the curve.

In the control system as described above AND and OR circuits are required. However, these circuits can be replaced by Nand circuits so that the same kinds of circuits are used throughout the entire system. Nand circuits have the characteristic of blocking and producing no output signal only during that time when there are input signals to all of the input terminals. It is apparent that with the use of Nand circuits, the functioning of the control system with respect to the transmission of signals in conductors 8, 9, 10 and 11 and also 30, 31 and 33 on the one hand and in relation to the conductors 40 and 42 on the other hand will not be changed.

The present control system can also be used for inclination of tilting control of an air cushion suspension system. The actuating signals generated by the control system can also be used for curvature responsive tilt control of a vehicle equipped with the usual leaf or coil springs by employing special cylinder and piston devices which only control the tilting of the vehicle body. The actuating signals may also be used to control the adjustment of curve control axles or the turning positions of vehicles as well as for curvature controlled vehicle couplings.

It is apparent that the measurement signals +b and $-b$ as well as $+db/dt$ and $-db/dt$ correspond with respect to their generation to the measurement signals $+\omega$ and $-\omega$ as well as $+\alpha$ and $-\alpha$ of the tilt control system in the co-pending patent application Ser. No. 798,405 filed Feb. 11, 1969 and assigned to the same assignee as the present application. The operation of the subject control device thus corresponds completely to the operation of the control device in the co-pending application.

The present invention provides an effective control system which generates actuating signals in response to the curvilinear or rectilinear travel of a vehicle to control the functioning of an air cushion suspension system to tilt the vehicle in the proper direction and to maintain the vehicle at a desired level relationship. The present control system employs different components in the form of AND circuits and OR circuits but can be modified by the use of combined circuits wherein the AND circuits and OR circuits are combined into Nand circuits. Nand circuits have the characteristic of generating an output signal only when one of the input signals is not transmitted to the input thereof. In order to obtain an actuating signal suitable for control purposes it is desirable to connect a signal amplifier after the OR circuit or the Nand circuit before which two Nand circuits are connected.

The air cushion suspension system of a vehicle to which the control system of the present invention is directed is generally provided with a third centrally positioned level regulator to maintain the longitudinal axis of tilt of the vehicle at a constant height. The air cushion bellows of the air cushion suspension system are generally characterized by having volumes which do not increase linearly with their heights. Further, losses of air from the air cushion bellows occur during actuation of the tilting control in response to the curvature of the path. For these reasons, when the vehicle travels along a curve there will occur during the tilting of the vehicle body a lowering of the longitudinal axis about which the vehicle body is tilted. The third level regulator which is switched in when the two lateral level regulators are disconnected will deliver compressed air into only that bellows which is then at the outside of the curve to raise the longitudinal axis of tilt during the tilting of the vehicle body. The actuating signal for this third level control device is generated from a switching system which during the actuation of an actuating signal responsive to the angular acceleration and angular velocity will switch in an actuating signal which is similarly responsive to the angular acceleration and angular velocity but which during that time remains independent of the direction of turning.

It is thus apparent that the present invention has disclosed a tilt control system which provides all of the advantages of the control system employing a gyroscope as disclosed in the above-mentioned pending application but at a much lower cost of installing this system. Further, the suspended weight arrangement disclosed herein is simple in construction and can be installed in less time than the corresponding gyroscope so as to also contribute to a significantly lower overall cost of installation.

It is understood that this invention is susceptible to modification in order to adapt it to different usages and conditions and, accordingly, it is desired to comprehend such modifications within the invention as may fall within the scope of the appended claims.

What is claimed is:

1. In a curve responsive tilt control system for a railway vehicle having an air cushion suspension system wherein control signals are generated when the vehicle is travelling along a curved path, the combination of measuring means within the vehicle for generating control signals responsive to the magnitude and direction of centrifugal forces and accelerations acting transversely upon the vehicle, means for differentiating said control signals to generate output signals which are differentials of the measuring means control signals, and signal modulator means connected and responsive to said measuring means and differentiating means for generating actuating signals to control the air cushion suspension so that the vehicle is tilted in the proper direction depending on the curvilinear travel of the vehicle.

2. In a curve responsive tilt control system as claimed in claim 1 wherein said measuring means comprises a suspended mass elastically deflectable transversely with respect to the longitudinal axis of the vehicle, means responsive to the deflection of said suspended mass for generating control signals indicative of the direction and magnitude of deflection, said differentiating means differentiating said control signals so that both the control signals and differentials thereof are transmitted to said signal modulator means.

3. In a curve responsive tilt control system as claimed in claim 2 wherein said signal generating means comprises one of variable inductance, capacitance or electrical resistance means varied in response to the magnitude and direction of deflection of said suspended mass.

* * * * *